9832X
R. A. Ives.
Comb.
No.
Patented July. 1. 1836.
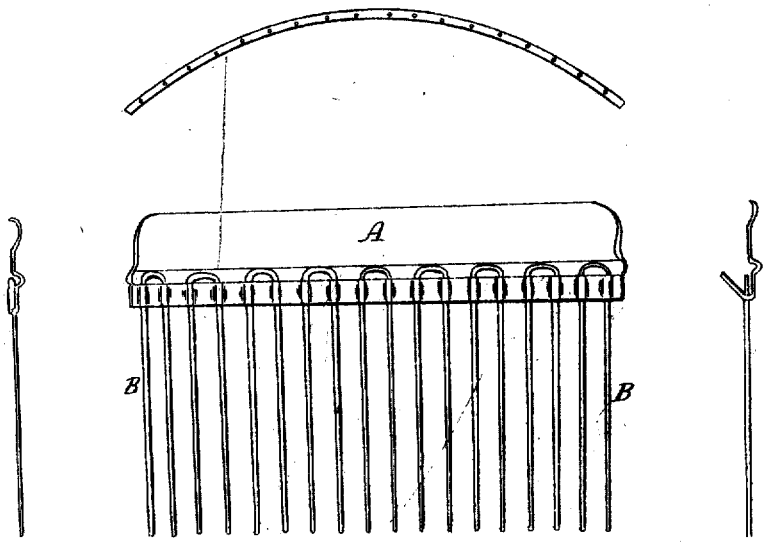

July 1. 1836 9837X

Richard Allison Ives, Bristol, Connecticut.

Letters Patent.

The schedule referred to in these Letters Patent, and making part of the same containing a description in the words of the said Richard Allison Ives himself of his Improvement in the mode of Manufacturing Metallic Combs.

To all to whom these presents shall come.
Be it known that I Richard Allison Ives of Bristol in the County of Hartford and State of Connecticut, have invented a new and useful improvement in the mode of making and manufacturing Metalic Combs, that is in the manner of placing and confining the teeth to the plate, top or back of the comb, and that the following is an exact description thereof. I take a thin metalic plate suitable for the top or back of the comb, on that part of the plate in which the teeth are to be placed and confined, and which is to be the lower side of the back when finished, with a suitable Swedge.

I make impressions for the teeth to be placed in lengthwise, These impressions or places for the teeth must be of a proper size according to the bigness of the teeth so that the teeth will exactly fit in and fill the places when closed up by that part of the plate to be turned up and closed upon the teeth, with similar impressions as hereafter described. At suitable distances from each other and at a proper distance from the lower edge of the plate, I make a line of holes through the plate, the whole length of it, of the bigness of the teeth for them to be passed through.

The teeth are made of some Metalic wire of a size required, according to the bigness of the comb. A piece of of wire long enough for two teeth, is bent at the middle and doubled, so as to bring the two parts parallel from where bent to the end of the teeth, and at a proper distance from each other for the teeth when the comb is finished. This piece of wire forms two teeth and a suitable number of these doubled teeth are passed through the holes made for them through the plate as before described. The lower part of the plate is then bent at the holes thro which the teeth pass, and turned up on the teeth so as to leave the bent part or bow of the teeth just above the edge of that part of the plate so turned up. This part of the plate so turned up is swedged down onto and between the teeth and they are let into the impressions made for them by swedging that part of the plate before it was bent and turned up. The teeth are then confined in the plate or back of the comb, by the two parts of the plate bent doubled and swedged together, and closing upon the teeth placed in the impressions made for them as before stated. And they are confined and prevented from moving down by the bow or bent part of the teeth, being pressed above and resting on the edge of the plate turned up upon them, and from moving up by a neck or ridge made in the back to project over and rest above the bent part or bow of the teeth.

Or instead of making holes through the plate for the teeth to be passed through and turning up the lower part of the plate on to the teeth as before described, the object may be effected by putting a separate piece of plate of suitable length and width and placing it on the teeth after being placed on the plate or back of the comb and fastening and confining the two plates together with the teeth between them, with rivets or in some other way, thereby confining the teeth between the two plates so fastened fastened together which plates form the top or back
of the comb
What I claim as my own invention and not
previously known is not the comb or any particular
shape ridge or form of the comb, but the manner of
fastening and confining the teeth in and to the back
or top of the comb by placing them in and between
the two parts of a double plate fitted & prepared for
them, and the two parts of the double plate con-
fined together and made to set close upon the
teeth; and made to confine the teeth from moving
up and down by the edge of one part of the dou-
ble plate being just below the bow or bend in the
teeth and by a ridge or neck in the plate just above
the bow or bend of the teeth as before described.
The benefit and advantage of this invention
and improvement is in saving of labour and
expense in making metalic combs.
Dated at Plymouth the 1st day of June 1836
Witnesses
Calvin Butler
George S. Gordon
Richard Allison Ives

[illegible]
Drawing Made
Exd
[illegible]

(Patented July 1. 1836.)